(12) United States Patent
Bertuccelli et al.

(10) Patent No.: US 10,460,431 B2
(45) Date of Patent: Oct. 29, 2019

(54) PART RECOGNITION AND DAMAGE CHARACTERIZATION USING DEEP LEARNING

(71) Applicant: Otis Elevator Company, Farmington, CT (US)

(72) Inventors: Luca F. Bertuccelli, West Hartford, CT (US); Kishore K. Reddy, Vernon, CT (US); Kin Gwn Lore, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/871,526

(22) Filed: Jan. 15, 2018

(65) Prior Publication Data
US 2019/0217340 A1 Jul. 18, 2019

(51) Int. Cl.
| | | |
|---|---|---|
| *G06T 7/00* | (2017.01) | |
| *G06K 9/62* | (2006.01) | |
| *B07C 5/342* | (2006.01) | |
| *B07C 5/12* | (2006.01) | |
| *G06T 7/73* | (2017.01) | |
| *B65G 47/49* | (2006.01) | |
| *G06T 7/70* | (2017.01) | |
| *G06K 9/32* | (2006.01) | |
| *G06K 9/46* | (2006.01) | |

(Continued)

(52) U.S. Cl.
CPC ............ *G06T 7/0002* (2013.01); *B07C 5/12* (2013.01); *B07C 5/342* (2013.01); *B65G 47/49* (2013.01); *G06K 9/3241* (2013.01); *G06K 9/4671* (2013.01); *G06K 9/6276* (2013.01); *G06T 7/001* (2013.01); *G06T 7/0004* (2013.01); *G06T 7/70* (2017.01); *G06T 7/74* (2017.01); *B65G 47/68* (2013.01); *G06K 9/6267* (2013.01); *G06N 3/08* (2013.01); *G06T 2207/20084* (2013.01); *G06T 2207/30164* (2013.01)

(58) Field of Classification Search
CPC .......................... G06K 9/6292; G06K 9/6276
See application file for complete search history.

(56) References Cited

U.S. PATENT DOCUMENTS

| | | | |
|---|---|---|---|
| 6,763,148 B1 | 7/2004 | Sternberg et al. | |
| 8,855,423 B2 * | 10/2014 | Boncyk | G06K 9/228 382/181 |

(Continued)

FOREIGN PATENT DOCUMENTS

| | | |
|---|---|---|
| CN | 104484523 A | 4/2015 |
| CN | 204737554 U | 11/2015 |

(Continued)

OTHER PUBLICATIONS

Brans, Pat; "Machine Learning to Deep Learning Systems: Are They Enterprise-Ready?" Cisco Cloud Technologies; https://www.cisco.com/c/en/us/solutions/cloud/deep-learning-systems.html; Dec. 27, 2017.

*Primary Examiner* — Thomas Randazzo
(74) *Attorney, Agent, or Firm* — Cantor Colburn LLP

(57) ABSTRACT

According to one embodiment, a method of identifying a part of a conveyance system is provided. The method comprising: capturing an image of a part of a conveyance system using a camera; classifying the part of the conveyance system using supervised learning; and displaying a classification of the part of the part on a mobile computing device.

14 Claims, 3 Drawing Sheets

(51) Int. Cl.
*B65G 47/68* (2006.01)
*G06N 3/08* (2006.01)

(56) References Cited

U.S. PATENT DOCUMENTS

| | | | |
|---|---|---|---|
| 8,867,859 | B1 | 10/2014 | Kwatra et al. |
| 9,324,022 | B2 | 4/2016 | Williams, Jr. et al. |
| 2007/0237426 | A1* | 10/2007 | Xie ............ G06F 16/5854 382/305 |
| 2014/0368649 | A1 | 12/2014 | Chen |
| 2015/0063627 | A1* | 3/2015 | Mohammad ......... G06T 7/001 382/103 |
| 2015/0332504 | A1 | 11/2015 | Wang et al. |
| 2015/0339453 | A1 | 11/2015 | Richards et al. |
| 2016/0034809 | A1 | 2/2016 | Trenholm et al. |
| 2016/0307071 | A1* | 10/2016 | Perronnin ......... G06K 9/4628 |
| 2017/0032281 | A1 | 2/2017 | Hsu |
| 2017/0213393 | A1 | 7/2017 | Fedosov et al. |
| 2017/0371329 | A1* | 12/2017 | Giering ........... G05B 23/0254 |
| 2018/0130222 | A1* | 5/2018 | Tafazoli Bilandi ....... G06T 7/70 |
| 2018/0157911 | A1* | 6/2018 | Lo ................... G06K 9/00657 |
| 2018/0293552 | A1* | 10/2018 | Zhang ............... G06N 3/0454 |
| 2018/0330194 | A1* | 11/2018 | Peng ................. G06K 9/6256 |
| 2018/0330205 | A1* | 11/2018 | Wu ................... G06K 9/6292 |
| 2018/0330511 | A1* | 11/2018 | Ha ..................... G06T 7/30 |

FOREIGN PATENT DOCUMENTS

| | | | |
|---|---|---|---|
| EP | 1901987 B1 | 10/2014 | |
| EP | 3155560 | 12/2015 | |
| ES | 2397728 A1 | 3/2013 | |
| FR | 2695632 A1 | 3/1994 | |
| GB | 2478738 A | 9/2011 | |
| JP | 2007091430 A | 4/2007 | |
| KR | 20170083419 A | 7/2017 | |
| WO | 2015161307 A1 | 10/2015 | |
| WO | 2017160688 A1 | 9/2017 | |
| WO | WO-2017160688 A1 * | 9/2017 | ............ G06F 17/18 |

\* cited by examiner

PART RECOGNITION AND DAMAGE CHARACTERIZATION USING DEEP LEARNING

BACKGROUND

The subject matter disclosed herein relates generally to the field of conveyance systems, and specifically to a method and apparatus for conveyance system part recognition and damage detection.

Field mechanics of conveyance systems are increasingly trying to complete maintenance and repair tasks more efficiently and safely. One key task that has been identified as a contributor to total time on site is identifying a part and determining whether that elevator part needs to be replaced. A multitude of part variations, challenging light conditions, and overall environmental conditions may make it time consuming for field mechanics of conveyance systems to identify elevator parts and determine damage.

BRIEF SUMMARY

According to one embodiment, a method of identifying a part of a conveyance system is provided. The method comprising: capturing an image of a part of a conveyance system using a camera; classifying the part of the conveyance system using supervised learning; and displaying a classification of the part of the part on a mobile computing device.

In addition to one or more of the features described above, or as an alternative, further embodiments may include that supervised learning further includes deep learning models.

In addition to one or more of the features described above, or as an alternative, further embodiments may include that classifying further includes: determining a classification of the part in response to the data.

In addition to one or more of the features described above, or as an alternative, further embodiments may include that classifying further includes: extracting a low dimension representation of the data; comparing the low dimensional representation of the image to at least one of renders of the computer-aided design (CAD) models of the part and previously taken images of the part; and determining a nearest neighbor for a classification of the part.

In addition to one or more of the features described above, or as an alternative, further embodiments may include that the low dimension representation of the images are extracted utilizing unsupervised feature extraction.

In addition to one or more of the features described above, or as an alternative, further embodiments may include that the sensor is operably included within the mobile computing device.

In addition to one or more of the features described above, or as an alternative, further embodiments may include that the sensor is operably attached to the mobile computing device.

In addition to one or more of the features described above, or as an alternative, further embodiments may include: determining a reconstruction error in response to the classification of the part and the nearest neighbor.

In addition to one or more of the features described above, or as an alternative, further embodiments may include: determining an amount of damage to the part in response to the reconstruction error.

In addition to one or more of the features described above, or as an alternative, further embodiments may include: detecting actual time-series data for the part; comparing the actual time-series data for the part to simulated time-series data demonstrating normal behavior of the part; and determining an amount of damage to the part in response to the reconstruction error.

According to another embodiment, a computer program product tangibly embodied on a computer readable medium is provided. The computer program product including instructions that, when executed by a processor, cause the processor to perform operations comprising: capturing an image of a part of a conveyance system using a sensor; classifying the part of the conveyance system using supervised learning; and displaying a classification of the part on a mobile computing device.

In addition to one or more of the features described above, or as an alternative, further embodiments may include that supervised learning further includes deep learning model.

In addition to one or more of the features described above, or as an alternative, further embodiments may include that classifying further includes: determining a classification of the part in response to the data.

In addition to one or more of the features described above, or as an alternative, further embodiments may include that classifying further includes: extracting a low dimension representation of the data; comparing the low dimensional representation of the image to at least one of renders of the computer-aided design (CAD) models of the part and previously taken images of the part; and determining a nearest neighbor for a classification of the part.

In addition to one or more of the features described above, or as an alternative, further embodiments may include that the low dimension representation of the images are extracted utilizing unsupervised feature extraction.

In addition to one or more of the features described above, or as an alternative, further embodiments may include that the sensor is operably included within the mobile computing device.

In addition to one or more of the features described above, or as an alternative, further embodiments may include that the sensor is operably attached to the mobile computing device.

In addition to one or more of the features described above, or as an alternative, further embodiments may include that the operations further comprise: determining a reconstruction error in response to the classification of the part and the nearest neighbor.

In addition to one or more of the features described above, or as an alternative, further embodiments may include that the operations further comprise: determining an amount of damage to the part in response to the reconstruction error.

In addition to one or more of the features described above, or as an alternative, further embodiments may include that the operations further comprise: detecting actual time-series data for the part; comparing the actual time-series data for the part to simulated time-series data demonstrating normal behavior of the part; and determining an amount of damage to the part in response to the reconstruction error.

Technical effects of embodiments of the present disclosure include utilizing a mobile device camera to recognize elevator parts through deep learning.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the disclosure are apparent from the following detailed description taken in conjunction with the accompanying drawings in which like elements are numbered alike in the several FIGURES.

DETAILED DESCRIPTION

Figure 1:
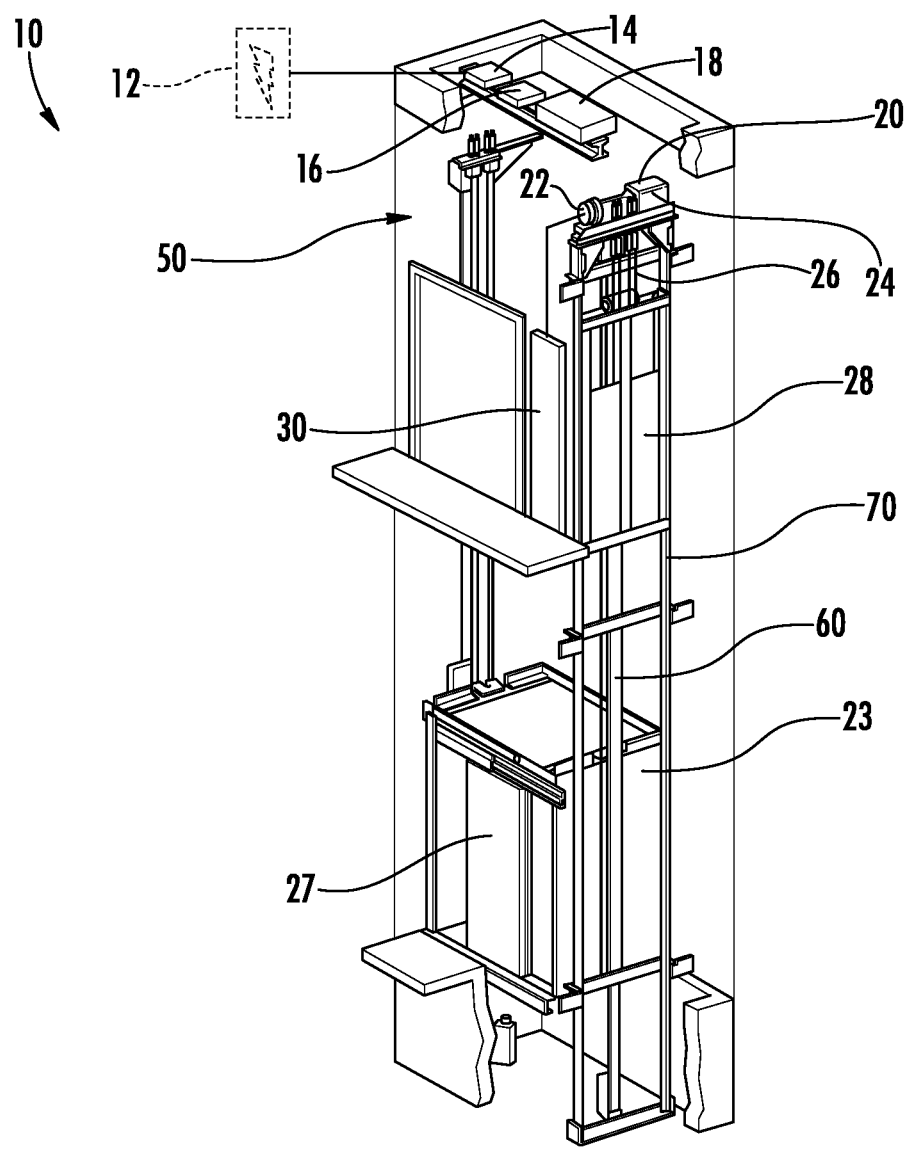
FIG. 1 illustrates a schematic view of an elevator system, in accordance with an embodiment of the disclosure.
Figure 2:
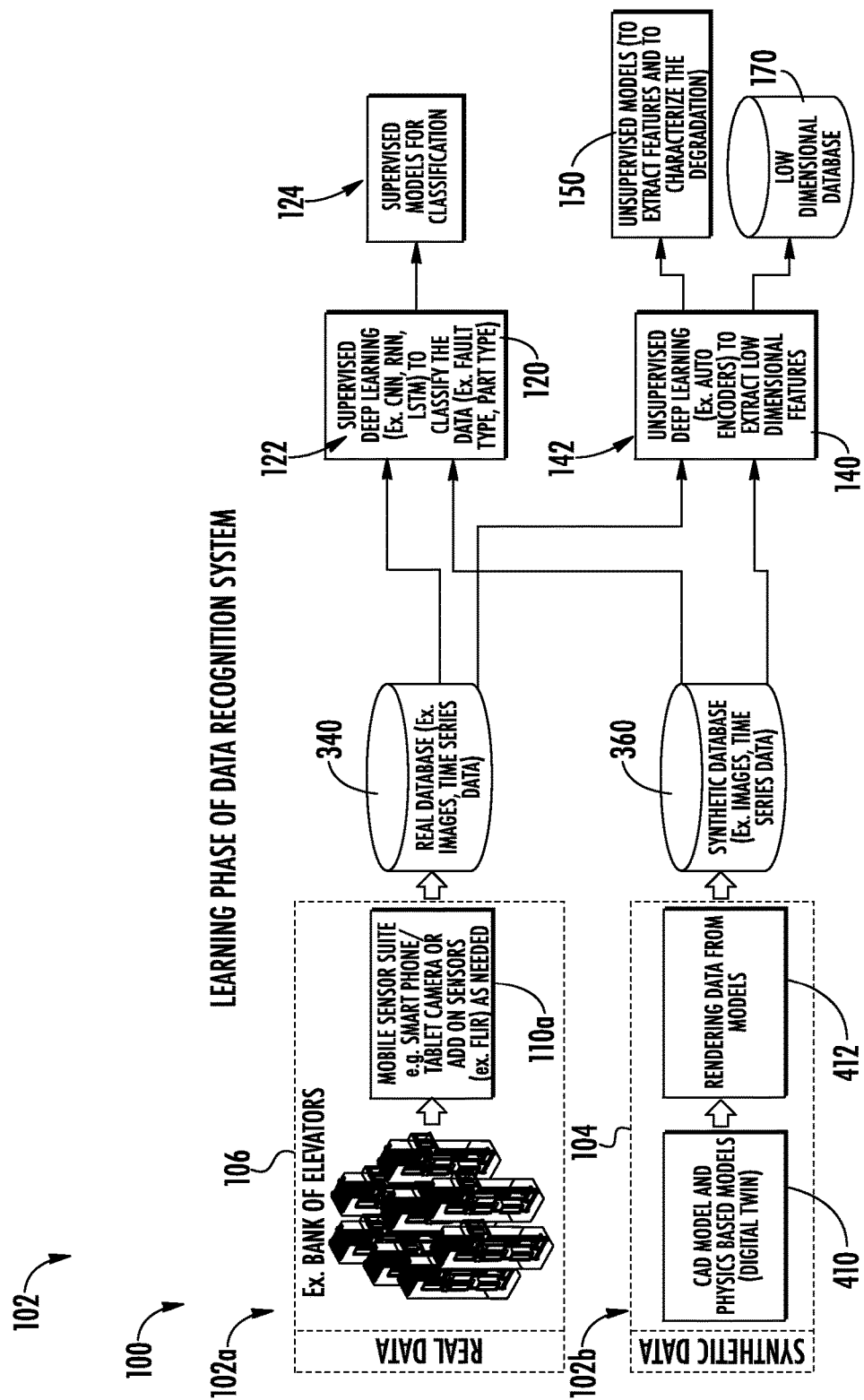
FIGS. 2-3 are a flow chart of the method of identifying a part of the elevator system of FIG. 1, in accordance with an embodiment of the disclosure.

FIG. 1 illustrates a schematic view of an elevator system 10, in accordance with an embodiment of the disclosure. It is understood that while an elevator system 10 is utilized for exemplary illustration, embodiments disclosed herein may be applied to other conveyance systems such as, for example, escalators. FIG. 2 illustrates a schematic view of a building elevator system 100 incorporating the elevator system 10 of FIG. 1, in accordance with an embodiment of the disclosure. With reference to FIG. 1, the elevator system 10 includes an elevator car 23 configured to move vertically upward and downward within a hoistway 50 along a plurality of car guide rails 60. As seen in FIG. 1, the elevator car 23 includes a door 27 configured to open and close, allowing passengers to enter and exit the elevator car 23. The elevator system 10 also includes a counterweight 28 operably connected to the elevator car 23 via a pulley system 26. The counterweight 28 is configured to move vertically upward and downward within the hoistway 50. The counterweight 28 moves in a direction generally opposite the movement of the elevator car 23, as is known in conventional elevator assemblies. Movement of the counterweight 28 is guided by counterweight guide rails 70 mounted within the hoistway 50.

The elevator system 10 also includes a power source 12. The power is provided from the power source 12 to a switch panel 14, which may include circuit breakers, meters, etc. From the switch panel 14, the power may be provided directly to the drive unit 20 through the controller 30 or to an internal power source charger 16, which converts AC power to direct current (DC) power to charge an internal power source 18 that requires charging. For instance, an internal power source 18 that requires charging may be a battery, capacitor, or any other type of power storage device known to one of ordinary skill in the art. Alternatively, the internal power source 18 may not require charging from the external power source 12 and may be a device such as, for example a gas powered generator, solar cells, hydroelectric generator, wind turbine generator or similar power generation device. The internal power source 18 may power various components of the elevator system 10 when an external power source is unavailable. The drive unit 20 drives a machine 22 to impart motion to the elevator car 23 via a traction sheave of the machine 22. The machine 22 also includes a brake 24 that can be activated to stop the machine 22 and elevator car 23. As will be appreciated by those of skill in the art, FIG. 1 depicts a machine room-less elevator system 10, however the embodiments disclosed herein may be incorporated with other elevator systems that are not machine room-less, hydraulic, or that include any other known elevator configuration. In addition, elevator systems having more than one independently operating elevator car in each elevator car shaft and/or ropeless elevator systems may also be used. In one embodiment, the elevator car 23 may have two or more compartments.

The controller 30 is responsible for controlling the operation of the elevator system 10. The controller 30 may also determine a mode (motoring, regenerative, near balance) of the elevator car 23. The controller 30 may use the car direction and the weight distribution between the elevator car 23 and the counterweight 28 to determine the mode of the elevator car 23. The controller 30 may adjust the velocity of the elevator car 23 to reach a target floor. The controller 30 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 3:
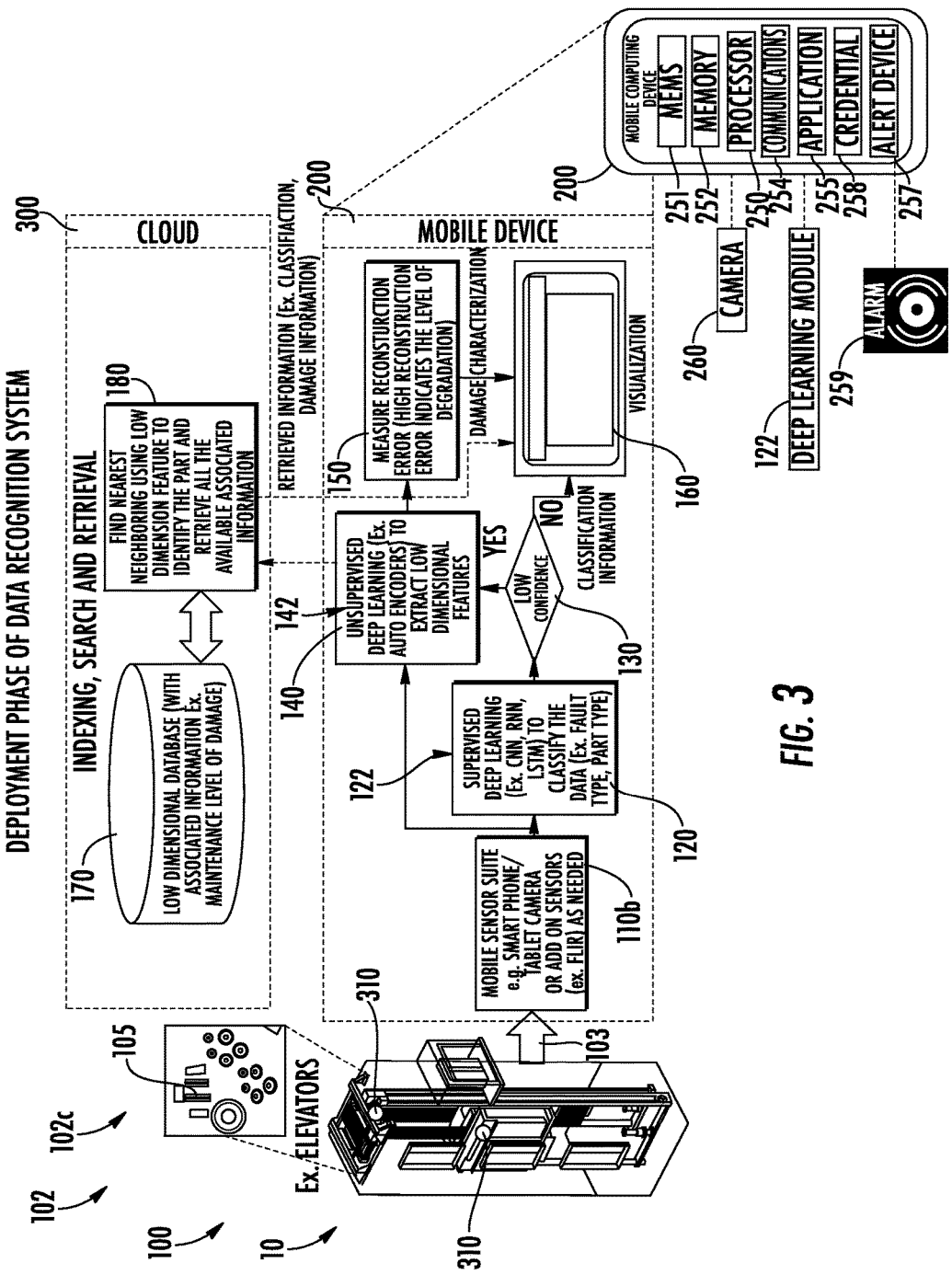

FIGS. 2 and 3 shows a data recognition system 100 and a flow chart of the method 102 of identifying a data of the elevator system of FIG. 1, in accordance with an embodiment of the present disclosure. In an embodiment the data may be a part of the elevator system. The data recognition system 100 includes a learning phase as shown in FIG. 2 and a deployment phase as shown in FIG. 3. The data recognition system 100 includes a mobile computing device 200 capable of being carried by an elevator technician on-site to an elevator system 10. The mobile computing device 200 may be a device that is typically carried by a person, such as, for example a phone, PDA, smart watch, tablet, laptop, etc. The mobile computing device 200 may be capable of capturing images 106 of elevator parts 105 of the elevator system 10 via a camera 260 that is included within the mobile computing device 200 and/or operably attached to the mobile computing device 200. In one example, the camera 260 may be a smartphone camera included in the smartphone. In another example, the camera 260 may be a separate camera that is operably attached to the mobile computing device 200 via a wired and/or wireless attachment mechanism. The camera 260 may be a forward looking infrared radiometer (FUR).

The mobile computing device 200 may include a processor 250, memory 252, communication module 254, and one or more Microelectromechanical systems (MEMS) sensor 251, as shown in FIG. 2. The MEMS sensor may be a sensor such as, for example, an accelerometer, a gyroscope, or a similar or other sensor known to one of skill in the art. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile computing device 200 including executable instructions stored therein, for instance, as firmware. The communication module 254 may implement one or more communication protocols as described in further detail herein. The mobile computing device 200 may include a credential 258 indicating what elevator technician the mobile computing device 200 belongs to. The mobile computing device 200 may include an alert device 257 configured to activate an alarm 259. In three non-limiting examples, the alert device 257 may be a vibration motor, audio speaker, and/or display screen. The alarm 259 may be audible, visual, haptic, and/or vibratory. The mobile computing device 200 may also include an application 255. Embodiments disclosed herein, may operate through the application 255 installed on the mobile computing device 200.

FIGS. 2-3 also shows a flow chart of method 102 of operating the data (e.g. image or time series) recognition system 100, in accordance with an embodiment of the disclosure. The method 102 is broken up into three segments, a real data learning phase 102a, a synthetic data learning phase 102b, and a deployment phase 102c. At block 110b, the mobile computing device 200 captures input data 103 of elevator parts 105 of the elevator system 10 via the camera 260. In an embodiment, the input data 106 may be images of the elevator parts 105. At block 120, a classification module 122 in the application 255 on the mobile computing device 200 is utilized to classify (i.e. identify) the part 105. In an embodiment, the classification module 122 may be a supervised deep learning model 124 (e.g. deep neural networks (DNN), convolution neural network (CNN), recurrent neural networks (RNN), and Long short-term memory networks (LSTM) and RNNs with gated recurrent units (GRU)). The classification module 122 may use a database 170 of synthetic data 104 and/or real data 106 to determine a classification of the input data 103 captured by the mobile computing device 200.

The classification depicts the identity of the input data 103. The classification may identify the input data 103 as a specific part 105. The classification module 122 may include and/or be operably connected to a real database 340, which includes previously taken real data (e.g. images or time series) 106 of parts 105 taken at different orientations, resolutions, illuminations, and scales (for images) or different operating modes (for time series). Real data 106 may be collected by sensors 310 and/or mobile computing devices 200 at block 110a and stored in a real database 340. The real data 106 is utilized by the classification module 122 (e.g. DNN, CNN, LSTM, RNN, GRU) to learn to perform classification of the input data 103, at block 120. The classification module may create supervised models for classification at block 124.

The real data 106 may also be utilized by the unsupervised deep learning module 142. Unsupervised feature extraction modules 142 such as Deep Auto Encoders (DAE), Convolutional Auto Encoders (CAE) and/or dimension reduction techniques (e.g. principal component analysis (PCA) and its variants) may be used to extract low dimension representation of the synthetic data 104 and/or real data 106, at block 140.

Synthetic data 104 may originate as computer-aided design (CAD) models 410 of various parts 105. Data may be rendered from the CAD models 410 at block 412 and the synthetic data 104 may be stored in synthetic database 360. The synthetic data 104 may also be shared with the database 170, where domain adaptation can be performed to bridge between synthetic data 104 and real data 106. The database 170 may be stored in the application 255 on the mobile computing device 200 and/or in a cloud computing network 300.

At block 120, if the classification module (e.g. CNN) does not have enough confidence (i.e. low confidence at block 130) that the data 106 taken by the mobile computing device 200 matches a part 105 in the database 170 then a low dimension representation will be extracted using the trained unsupervised feature extraction module 142 (e.g. DAE and/or CAE) at block 140 and the low dimension representation will be used to search for a nearest neighbor (i.e. closest matching part 105) in the parts database 170 to identify the part 105 at block 180.

The unsupervised feature extraction module 142 can also analyze a reconstruction error to determine an amount of damage to the part 105. For example, the nearest neighbor (i.e. closest matching part 105) in the parts database 170 may not exactly match the part 105 due to damage on the part 105 but an amount of damage may be determined by the reconstruction error measured between the nearest neighbor and the part 105.

The reconstruction error along with the nearest neighboring part may be viewed on the mobile computing device 200 of the elevator technician at block 160. Relevance feedback may be provided by an elevator technician utilizing the mobile computing device 200 after they have reviewed the nearest neighbor of the part 105 that they took an image 106 of using the camera 260.

Additionally, to help further detect damage to a part 105, one or more sensors 310 may be operably connected to various parts 105 of the elevator system 10. The sensors 310 may collect real data 106 (e.g. actual time-series data) for each part 105 of the elevator system 10. The real data 106 may include sensor 310 measurements of each part 105 during operating conditions. The real data 106 (e.g. actual time-series data) is stored in the real database 340 that may be located in the cloud 300. Synthetic data 104 (e.g. simulated time-series data) demonstrating normal behavior of each part 105 may also be stored in the cloud 300. The synthetic data 104 (e.g. simulated time-series data) is stored in the synthetic database 360. Recurrent architectures (e.g. RNN, LSTM, GRU) can be used with the feature extraction module (e.g. DAE) to learn from the synthetic data 104 (e.g. simulated time-series data) to compare to the real data 106 (e.g. actual time-series data) to determine anomalies (i.e. an amount of damage) in each part 105.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting. While the description has been presented for purposes of illustration and description, it is not intended to be exhaustive or limited to embodiments in the form disclosed.

Many modifications, variations, alterations, substitutions or equivalent arrangement not hereto described will be apparent to those of ordinary skill in the art without departing from the scope of the disclosure. Additionally, while the various embodiments have been described, it is to be understood that aspects may include only some of the described embodiments. Accordingly, the disclosure is not to be seen as limited by the foregoing description, but is only limited by the scope of the appended claims.

What is claimed is:

1. A method of identifying a part of a conveyance system, the method comprising:
   capturing real data of a conveyance system;
   capturing synthetic data of the conveyance system;
   performing domain adaption to bridge between the synthetic data and the real data;
   determining a supervised deep learning model in response to the real data, the synthetic data, and the bridge adaption;
   determining an unsupervised deep learning model in response to the real data, the synthetic data, and the bridge adaption;
   capturing an image of a part of the conveyance system using a camera;
   classifying the part of the conveyance system using the image and at least one of the supervised deep learning model and the unsupervised deep learning model;
   displaying a classification of the part on a mobile computing device;
   determining a reconstruction error in response to the classification of the part and the nearest neighbor; and
   determining an amount of damage to the part in response to the reconstruction error using recurrent architectures and feature extraction modules.

2. The method of claim 1, wherein:
   supervised deep learning model further includes deep learning models.

3. The method of claim 1, wherein classifying further includes:
   determining a classification of the part in response to the image and the supervised deep learning model.

4. The method of claim 1, wherein classifying further includes:
   extracting a low dimension representation of the image using the unsupervised deep learning model;
   comparing the low dimensional representation of the image to at least one of renders of the synthetic data and the real data; and
   determining a nearest neighbor for a classification of the part.

5. The method of claim 1, wherein:
   the low dimension representation of the images are extracted utilizing unsupervised feature extraction.

6. The method of claim 1, wherein:
   the sensor is operably included within the mobile computing device.

7. The method of claim 1, wherein:
   the sensor is operably attached to the mobile computing device.

8. A computer program product tangibly embodied on a computer readable medium, the computer program product including instructions that, when executed by a processor, cause the processor to perform operations comprising:
   capturing real data of a conveyance system;
   capturing synthetic data of the conveyance system;
   performing domain adaption to bridge between the synthetic data and the real data;
   determining a supervised deep learning model in response to the real data, the synthetic data, and the bridge adaption;
   determining an unsupervised deep learning model in response to the real data, the synthetic data, and the bridge adaption;
   capturing an image of a part of the conveyance system using a sensor;
   classifying the part of the conveyance system using the image and at least one of the supervised deep learning model and the unsupervised deep learning model;
   displaying a classification of the part on a mobile computing device;
   determining a reconstruction error in response to the classification of the part and the nearest neighbor; and
   determining an amount of damage to the part in response to the reconstruction error using recurrent architectures and feature extraction modules.

9. The computer program product of claim 8, wherein:
   supervised deep learning model further includes deep learning model.

10. The computer program product of claim 8, wherein classifying further includes:
    determining a classification of the part in response to the image and the supervised deep learning model.

11. The computer program product of claim 8, wherein classifying further includes:
    extracting a low dimension representation of the image using the unsupervised deep learning model;
    comparing the low dimensional representation of the image to at least one of renders of the synthetic data and the real data; and
    determining a nearest neighbor for a classification of the part.

12. The computer program product of claim 8, wherein:
    the low dimension representation of the images are extracted utilizing unsupervised feature extraction.

13. The computer program product of claim 8, wherein:
    the sensor is operably included within the mobile computing device.

14. The computer program product of claim 8, wherein:
    the sensor is operably attached to the mobile computing device.

* * * * *